United States Patent
Lee et al.

(10) Patent No.: US 7,648,310 B2
(45) Date of Patent: Jan. 19, 2010

(54) APPARATUS FOR PREVENTING SOIL INFLOW IN INTERCEPTING SEWER

(75) Inventors: Sung-woo Lee, Daejeon (KR); In-jae Jeon, Daejeon (KR)

(73) Assignee: Mirae Green Construction Co., Ltd. (KR)

( * ) Notice: Subject to any disclaimer, the term of this patent is extended or adjusted under 35 U.S.C. 154(b) by 211 days.

(21) Appl. No.: 11/629,285

(22) PCT Filed: Sep. 8, 2005

(86) PCT No.: PCT/KR2005/002966

§ 371 (c)(1),
(2), (4) Date: Dec. 12, 2006

(87) PCT Pub. No.: WO2006/031031

PCT Pub. Date: Mar. 23, 2006

(65) Prior Publication Data

US 2008/0060986 A1    Mar. 13, 2008

(30) Foreign Application Priority Data

| Sep. 18, 2004 | (KR) | 10-2004-0074848 |
| Oct. 4, 2004 | (KR) | 10-2004-0078593 |
| Nov. 16, 2004 | (KR) | 20-2004-0032457 U |
| Dec. 8, 2004 | (KR) | 20-2004-0034917 U |
| Jan. 15, 2005 | (KR) | 10-2005-0004015 |
| Dec. 9, 2005 | (KR) | 20-2004-0035063 U |

(51) Int. Cl.
*E03F 5/14* (2006.01)

(52) U.S. Cl. ............... 405/36; 405/40; 405/100; 404/4; 210/163

(58) Field of Classification Search ............ 405/36, 405/92–95, 98–101; 210/131, 156, 163; 404/2–5
See application file for complete search history.

(56) References Cited

U.S. PATENT DOCUMENTS

| 5,323,804 | A * | 6/1994 | Lin | 137/362 |
| 6,726,402 | B1 * | 4/2004 | Martinez | 405/40 |
| 2003/0183570 | A1 * | 10/2003 | Takarabe | 210/267 |
| 2004/0023761 | A1 * | 2/2004 | Emery | 482/94 |

FOREIGN PATENT DOCUMENTS

| JP | 2000-144871 | 5/2000 |
| KR | 20-0171293 | 12/1999 |
| KR | 20-0234791 | 6/2001 |
| KR | 1020010086955 A | 9/2001 |
| WO | WO02077378 | 10/2002 |
| WO | WO02086248 | 10/2002 |

OTHER PUBLICATIONS

Korean Patent Information Online Network, Apparatus for Preventing Reverse Flow in Drainage, Machine Translation.*

(Continued)

*Primary Examiner*—David J Bagnell
*Assistant Examiner*—Benjamin Fiorello
(74) *Attorney, Agent, or Firm*—Cantor Colburn LLP (57) ABSTRACT

Disclosed herein is a soil inflow prevention apparatus in which an angular-rotation opening/closing plate is adapted to be inclined within a predetermined angle by virtue of opening stoppers to prevent a rear portion of the opening/closing plate from being excessively lowered in the beginning that an inflow amount of sewage increases due to rainfall, thereby preventing soil from entering an intercepting sewer in the beginning of an inflow of sewage.

10 Claims, 12 Drawing Sheets

OTHER PUBLICATIONS

Korean Patent Information Online Network, Protect Apparatuf of Earth and Sand's Inflow, Machine Translation.*
Korean Publication No. 1020010086955 machine translation, Kang-woo Lee.*

PCT Written Opinion of the International Searching Authority; PCT/KR2005/002966; Date: Dec. 22, 2005.
PCT International Search Report; PCT/KR2005/002966; Date: Dec. 22, 2005 All the references cited in the Search Report are listed above.

* cited by examiner

APPARATUS FOR PREVENTING SOIL INFLOW IN INTERCEPTING SEWER

TECHNICAL FIELD

The present invention relates to a soil inflow prevention apparatus for use in an intercepting sewer, and, more particularly, to a soil inflow prevention apparatus for preventing soil from entering an intercepting sewer provided at a drainage ditch when an excess of sewage, i.e. rainwater, is introduced into the drainage ditch due to rainfall.

BACKGROUND ART

A general drainage ditch refers to a passage for collecting and draining large volumes of sewage. Here, sewage refers to rainwater containing sewage. A discharge side of the drainage ditch is usually connected to a river.

As conventionally known in the art, such a drainage ditch is provided, at the discharge side thereof, with an intercepting sewer, which guides sewage, introduced from the drainage ditch, into a sewage treatment plant for the purification of sewage. The drainage ditch is also provided, in the rear of the intercepting sewer, with a barrier wall structure having a predetermined height. The barrier wall structure serves to prevent soil contained in sewage from entering the intercepting sewer and to filter other wastes.

The intercepting sewer is transversely arranged underneath a longitudinal drainage ditch, and has an upper opening that is formed at the bottom of the drainage ditch to extend throughout the width of the drainage ditch. The upper opening is sectionalized by use of a plurality of longitudinal bars, and a plurality of intercepting plates is arranged by a predetermined distance. Thereby, a plurality of sewage inflow holes, each being defined at opposite sides thereof by the longitudinal bars, is formed between the intercepting plates.

The barrier wall structure includes a plurality of walls to prevent an inflow of soil, and screens interposed between the walls to allow other wastes contained in sewage, except for soil, to be introduced into the intercepting sewer.

The conventional drainage ditch having the above configuration, however, has a problem in that, when an inflow amount of sewage excessively increases due to rainfall, soil flows over the barrier wall structure, and enters the intercepting sewer. As a result, the soil is accumulated in the intercepting sewer, resulting in a reduction in an available drainage cross section of the intercepting sewer. Also, soil, introduced into a sewage treatment plant, degrades purification efficiency of the sewage treatment plant.

To solve the above problems, there are known various conventional soil inflow prevention apparatuses for preventing soil from entering an intercepting sewer when it rains. Hereinafter, several examples of the conventional soil inflow prevention apparatuses will be explained.

Firstly, there is known a soil inflow prevention apparatus (hereinafter, referred to as "a conventional first soil inflow prevention apparatus) as disclosed in Registered Korean Utility Model Application No. 1999-18530.

The conventional first soil inflow prevention apparatus comprises: a frame plate rotatably coupled to one of sewage inflow holes, which are defined at the top of an intercepting sewer, by use of a rear fixing shaft, to open and close the sewage inflow hole; a sewage inlet perforated at the frame plate; a support arranged in the intercepting sewer beneath the sewage inlet; a spring device interposed between a front portion of the frame plate and the support; and a sewage inflow prevention plate mounted beneath the frame plate and adapted to close the sewage inlet when the frame plate closes the sewage inflow hole.

Under normal conditions, the front portion of the frame plate is inclined upward by use of elastic repulsive force of the spring device, so that sewage passes through the sewage inlet, located at the downwardly inclined rear portion of the frame plate, by a constant flow rate, so as to be guided into a sewage treatment plant by way of the intercepting sewer. However, if an inflow amount of sewage excessively increases due to rainfall, the frame plate is lowered to keep a horizontal state and the sewage inlet is closed by the horizontal frame plate. Thereby, the conventional first soil inflow prevention apparatus having the above configuration allows soil, contained in rainwater, to be directly discharged to a river, without entering the intercepting sewer.

In the case of the conventional first soil inflow prevention apparatus, the frame plate is designed to be opened and closed by use of elastic repulsive force of the spring device. However, this configuration has a problem in that the soil inflow prevention apparatus malfunctions when the spring device losses a restoration force after extended use.

Also, since the spring device is arranged in the intercepting sewer and inevitably always comes into contact with sewage, there is a problem in that the spring device is easily rusted within a short time.

As a solution of the above problems, there is also known a soil inflow prevention apparatus (hereinafter, referred to as a conventional second soil inflow prevention apparatus) as disclosed in Registered Korean Utility Model Application No. 2001-1706.

The conventional second soil inflow prevention apparatus comprises: a support formed at the periphery of a sewage inflow hole of an intercepting sewer; and a frame plate located at a front location of the support to be inclined about a pivoting shaft.

In the conventional second soil inflow prevention apparatus having the above configuration, under normal conditions, the frame plate is inclined so that a rear portion thereof is lowered. Thereby, sewage can be introduced into the intercepting sewer by a constant flow rate, and can be guided into a sewage treatment plant. However, if an inflow amount of sewage excessively increases due to rainfall, a front portion of the frame plate is downwardly pushed until the frame plate is kept in a horizontal state. As a result, soil, contained in rainwater, is directly discharged to a river, without entering the intercepting sewer.

Figure 12:
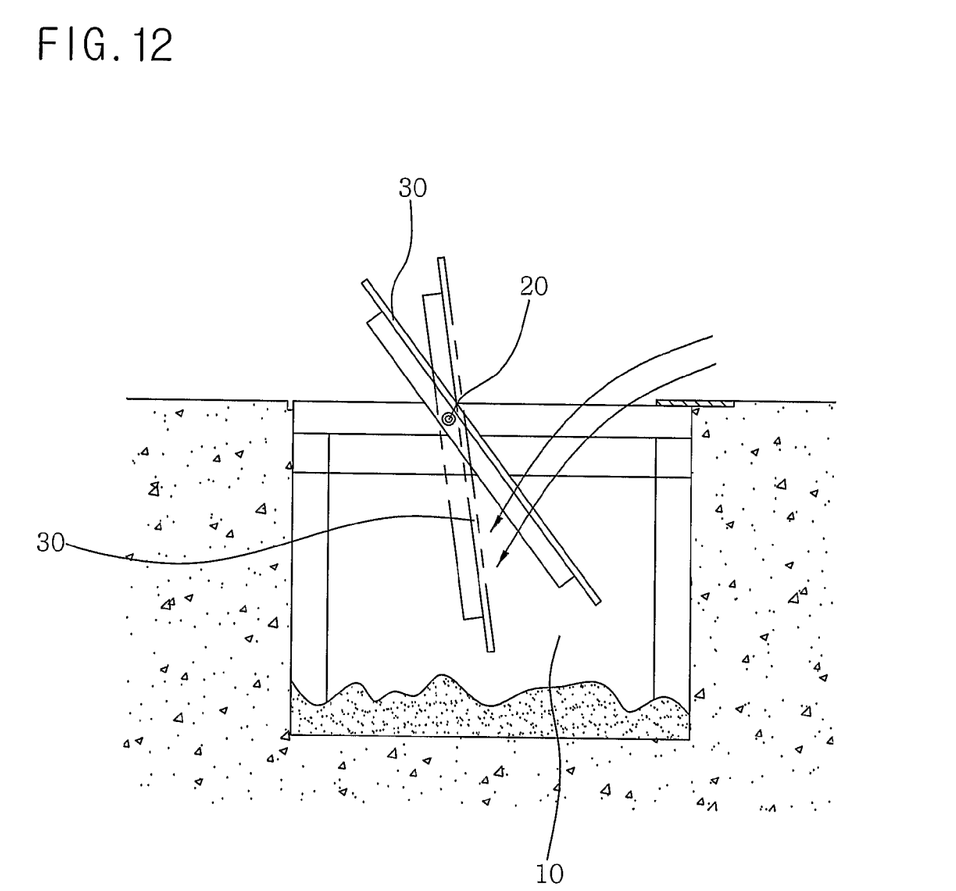
FIG. 12 is a schematic sectional view explaining operation of a conventional soil inflow prevention apparatus.

As clearly shown in FIG. 12, where a flow rate of sewage is constant, the frame plate 30 of the conventional second soil inflow prevention apparatus is inclined about the pivoting shaft 20 to open a rear region of the sewage inflow hole, as indicated by a solid line.

However, if an inflow amount of sewage increases due to rainfall, an excess of sewage collides with a lowered portion of the frame plate 20 and is rapidly introduced into the intercepting sewer 10. Thus, the frame plate 30 is rapidly rotated to keep a substantially vertical state, as indicated by a dash dot dotted line.

After the intercepting sewer is completely filled with the sewage, an excess of sewage acts to push a raised portion of the frame plate 30 as it flows over the sewage inflow hole. As a result, the frame plate 30 is kept in a horizontal state after the lapse of a certain time from a time point when the amount of sewage increases, thereby serving to close the sewage inflow hole.

A problem of this configuration is that soil enters the intercepting sewer 10 along with sewage in the beginning of an inflow of sewage.

DISCLOSURE OF THE INVENTION

Therefore, the present invention has been made in view of the above problems, and it is an object of the present invention to provide a soil inflow prevention apparatus in which an angular-rotation opening/closing plate is adapted to be inclined within a predetermined angle by virtue of opening stoppers to prevent a rear portion of the opening/closing plate from being excessively lowered in the beginning that an inflow amount of sewage increases due to rainfall, thereby preventing soil from entering an intercepting sewer in the beginning of an inflow of sewage.

It is another object of the present invention to provide a soil inflow prevention apparatus in which an angular-rotation opening/closing plate can be operated to open a sewage inflow hole of an intercepting sewer merely by the weight of sewage.

It is a further object of the present invention to provide a soil inflow prevention apparatus in which a rotating shaft is mounted at a position close to a front end of an angular-rotation opening/closing plate, rather than being mounted along a center axis of the opening/closing plate, whereby a rear portion of the angular-rotation opening/closing plate is heavier than a front portion thereof to ensure smooth inflow of sewage into an intercepting sewer under normal conditions.

It is further another object of the present invention to provide a soil inflow prevention apparatus in which at least one weight-adjustable or exchangeable weighting device is provided at a rear portion of an angular-rotation opening/closing plate, whereby a closing force of the angular-rotation opening/closing plate can be adjusted in response to a variation in the amount of sewage due to rainfall, and the rear portion of the angular-rotation opening/closing plate is inclined downward to open a rear region of a sewage inflow hole under normal conditions.

It is yet another object of the present invention to provide a soil inflow prevention apparatus in which bearings are mounted not only at opposite ends of a rotating shaft, but also at connecting portions between the rotating shaft and an angular-rotation opening/closing plate, whereby the angular-rotation opening/closing plate can be delicately and sensitively operated in response to a variation in the amount of sewage.

In accordance with an aspect of the present invention, the above and other objects can be accomplished by the provision of a soil inflow prevention apparatus for use in an intercepting sewer that is provided at a discharge side of a drainage ditch and has one or more sewage inflow holes, the apparatus comprising: a rotating shaft transversely extending throughout a respective one of the sewage inflow holes; an angular-rotation opening/closing plate coupled to the rotating shaft and adapted to open and close the sewage inflow hole in accordance with the amount of sewage; at least one opening stopper provided at a peripheral location of the sewage inflow hole in the rear of the rotating shaft or at a rear wall of the intercepting sewer to control an opening angle of the angular-rotation opening/closing plate; and at least one balancing stopper provided at the periphery of the sewage inflow hole in the front or rear of the rotating shaft to keep the angular-rotation opening/closing plate in a closed state.

DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be explained in detail with reference to the accompanying drawings.

Figure 1:
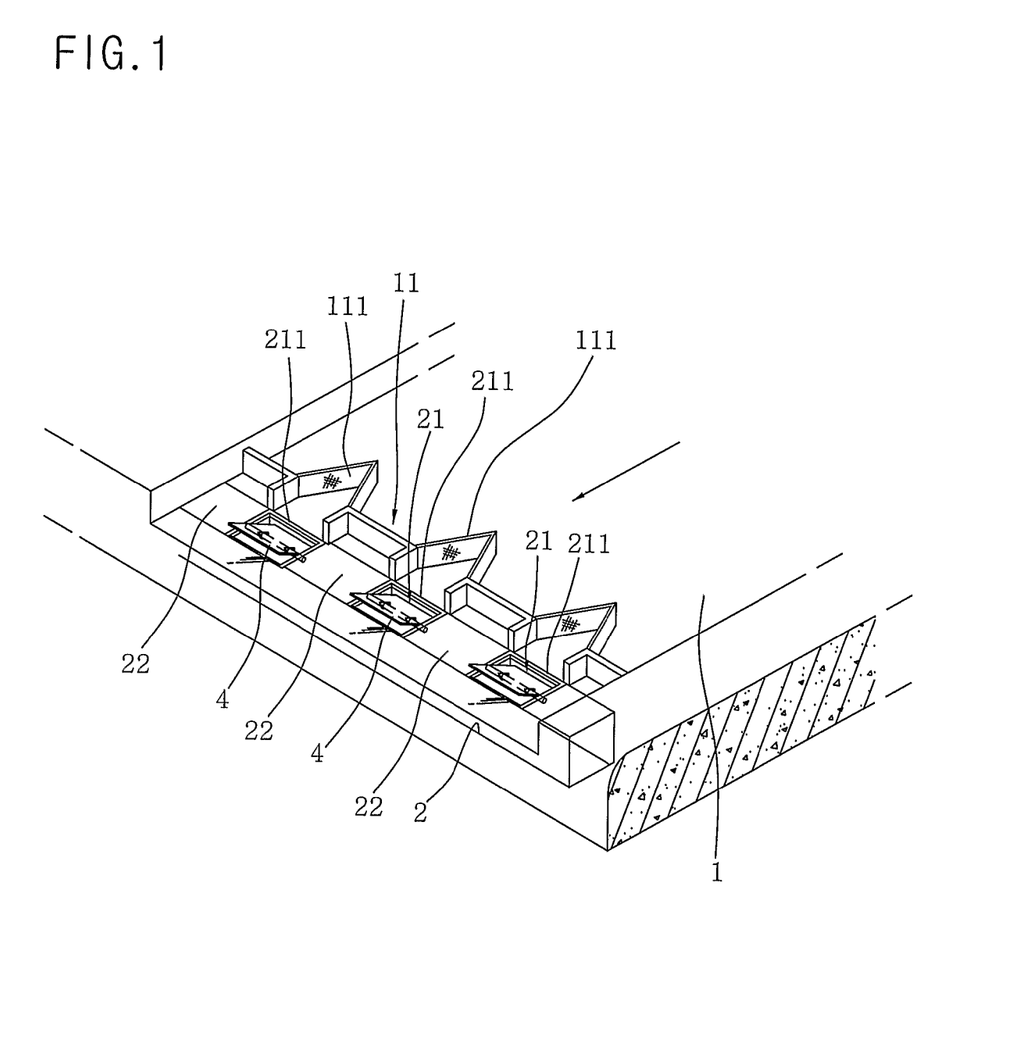
FIG. 1 is a perspective view illustrating a drainage ditch having a soil inflow prevention apparatus according to a first embodiment of the present invention.
Figure 2:
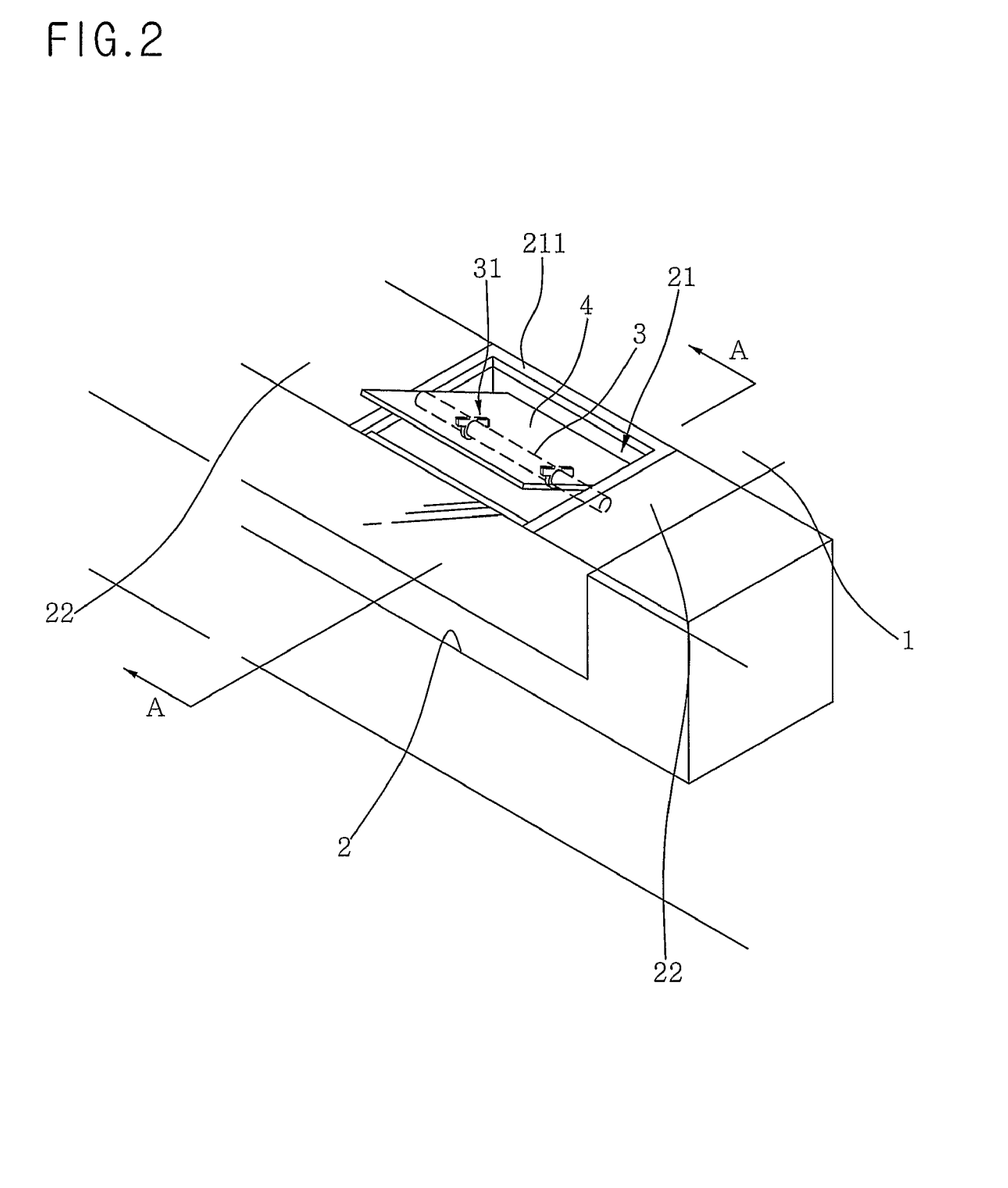
FIG. 2 is an enlarged perspective view illustrating the soil inflow prevention apparatus according to the first embodiment of the present invention.
Figure 3:
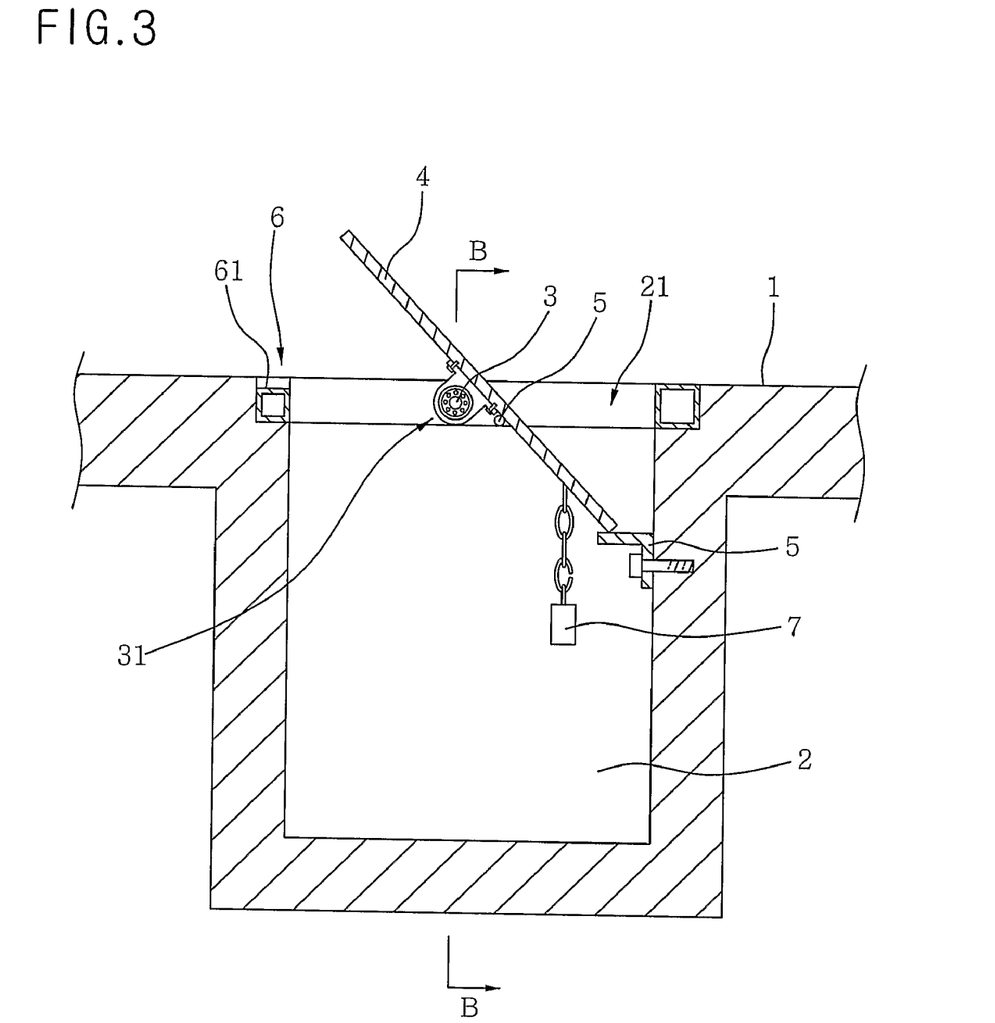
FIG. 3 is an enlarged sectional view taken along line A-A of FIG. 2.

FIG. 1 is a perspective view illustrating a drainage ditch having a soil inflow prevention apparatus according to a first embodiment of the present invention. FIG. 2 is an enlarged perspective view illustrating the soil inflow prevention apparatus according to the first embodiment of the present invention. FIG. 3 is an enlarged sectional view taken along the line A-A of FIG. 2.

The soil inflow prevention apparatus of the present invention is to be used at an intercepting sewer 2, which is provided at a discharge side of a drainage ditch 1 and has one or more sewage inflow holes 21. More particularly, the soil inflow prevention apparatus serves to prevent soil from entering the sewage inflow holes 21 in rainy weather. The sewage inflow holes 21 are defined at an open top of the intercepting sewer 2 by a predetermined distance. To define the sewage inflow holes 21, a plurality of longitudinal bars is arranged by a predetermined distance across the open top of the intercepting sewer 2, and a plurality of intercepting plates 22 is covered between the longitudinal bars while remaining spaces that will define the sewage inflow holes 21. Therefore, a periphery of each sewage inflow hole 21 consists of a pair of the longitudinal bars located at opposite lateral sides of the sewage inflow hole 21 and upper edges of front and rear walls constituting the intercepting sewer 2. Hereinafter, no detailed description in relation with the sewage inflow hole 21 or the periphery of the sewage inflow hole 21 will be given. Also, the following description deals with only one sewage inflow hole 21 because all the sewage inflow holes 21 are identical.

The soil inflow prevention apparatus of the present invention for use in the sewage inflow hole 21 of the intercepting sewer 2 comprises: a rotating shaft 3 transversely extending throughout the width of the sewage inflow hole 21; an angular-rotation opening/closing plate 4 coupled to the rotating shaft 3 to open and close the sewage inflow hole 21 in accordance with the amount of sewage; at least one opening stopper 5 provided at a peripheral location of the sewage inflow hole 21 in the rear of the rotating shaft 3 or at the rear wall of the intercepting sewer 2 to control an opening angle of the angular-rotation opening/closing plate 4; and at least one balancing stopper 6 provided on the periphery of the sewage inflow hole 21 in the front or rear of the rotating shaft 3 to keep the angular-rotation opening/closing plate 4 in a closed state.

The rotating shaft 3 is fixed to the angular-rotation opening/closing plate 4 along a longitudinal center axis of the opening/closing plate 4 by use of connection means 31, so that a rear portion of the angular-rotation opening/closing plate 4 that is centrally fixed to the rotating shaft 3 can be tilted downward merely by the weight of a sewage inflow, to open the sewage inflow hole 21. As shown in the accompanying drawings, the first embodiment of the present invention further employs at least one rear weighting device 7.

Also, the sewage inflow hole 21 is provided, at the periphery thereof, with a metallic frame 211 having a high strength sufficient to support the rotating shaft 3 and the angular-rotation opening/closing plate 4.

The balancing stopper 6 takes the form of a recessed portion 61, which is formed at a front end position of the periphery of the sewage inflow hole 21, to catch the front end of the angular-rotation opening/closing plate 4.

The rear weighting device 7 is suspended from a lower surface of the rear portion of the angular-rotation opening/closing plate 4, to adjust a closing force of the angular-rotation opening/closing plate 4 in accordance with the amount of sewage. The rear weighting device 7 is exchangeably mounted by means of connection means, such as loops, to increase or decrease a weight thereof as occasion demands.

Under normal conditions, the rear weighting device 7 acts to pull the rear portion of the angular-rotation opening/closing plate 4 down, thereby serving to open a rear region of the sewage inflow hole 21.

Figure 4:
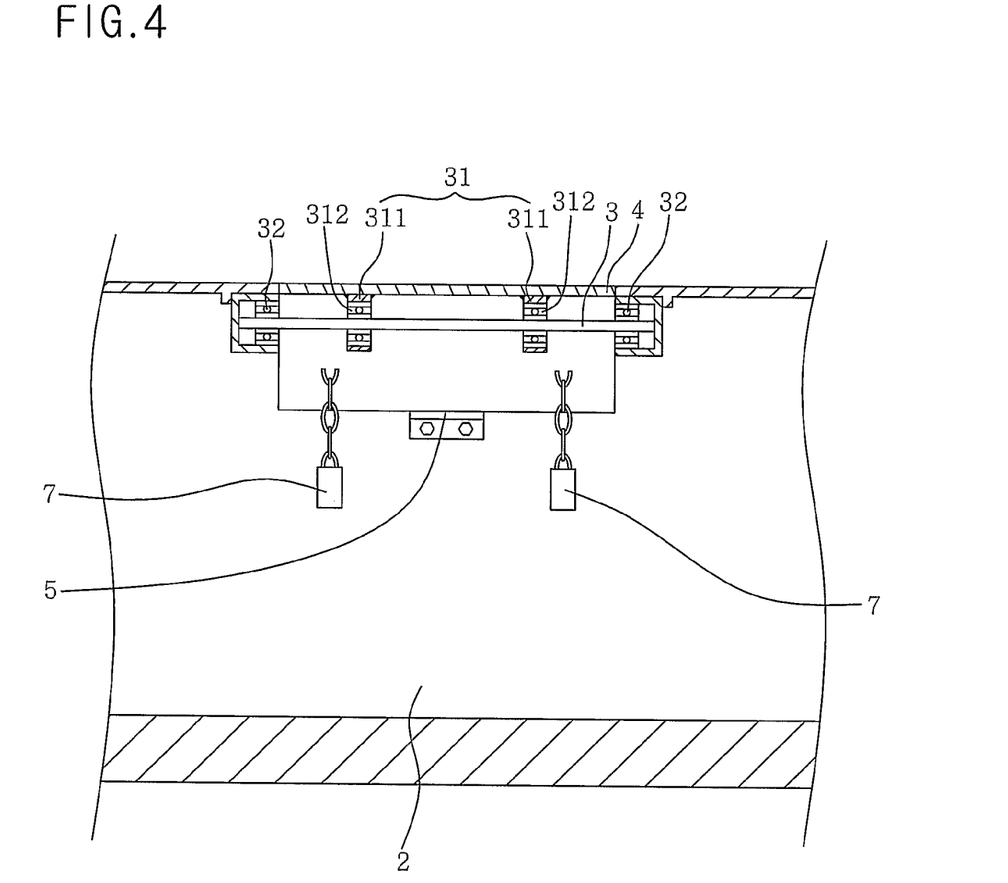
FIG. 4 is a sectional view taken along line B-B of FIG. 3.

FIG. 4 is a sectional view taken along the line B-B of FIG. 3. Referring to FIG. 4, a pair of bearings 32 is provided between opposite ends of the rotating shaft 3 and opposite lateral sides of the sewage inflow hole 21, respectively, to enable smooth rotation of the rotating shaft 3.

The connection means 31 includes one or more bearing brackets 311 affixed to the lower surface of the angular-rotation opening/closing plate 4, and bearings 312 provided in the bearing brackets 311, respectively. The rotating shaft 3 is penetrated through and assembled to the bearings 312 in a smoothly rotatable manner.

Arranging the plurality of bearings 32 and 312 not only at the opposite ends of the rotating shaft 3, but also at the connection means 31 has the effect of allowing the angular-rotation opening/closing plate 4 to minutely rotate in response to a variation in the amount of sewage. This prevents malfunction due to irrotational motion of the angular-rotation opening/closing plate 4.

Reference numeral 11 indicates a barrier wall having a predetermined height, which is provided at the drainage ditch 1 in the rear of the intercepting sewer 2. The barrier wall 11 serves to primarily prevent soil, contained in a sewage inflow, from entering the intercepting sewer 2. Also, reference numeral 111 indicates a screen included in the barrier wall 11 to physically filter the sewage inflow.

Hereinafter, the operation of the soil inflow prevention apparatus according to the first embodiment of the present invention will be explained.

Figure 5:
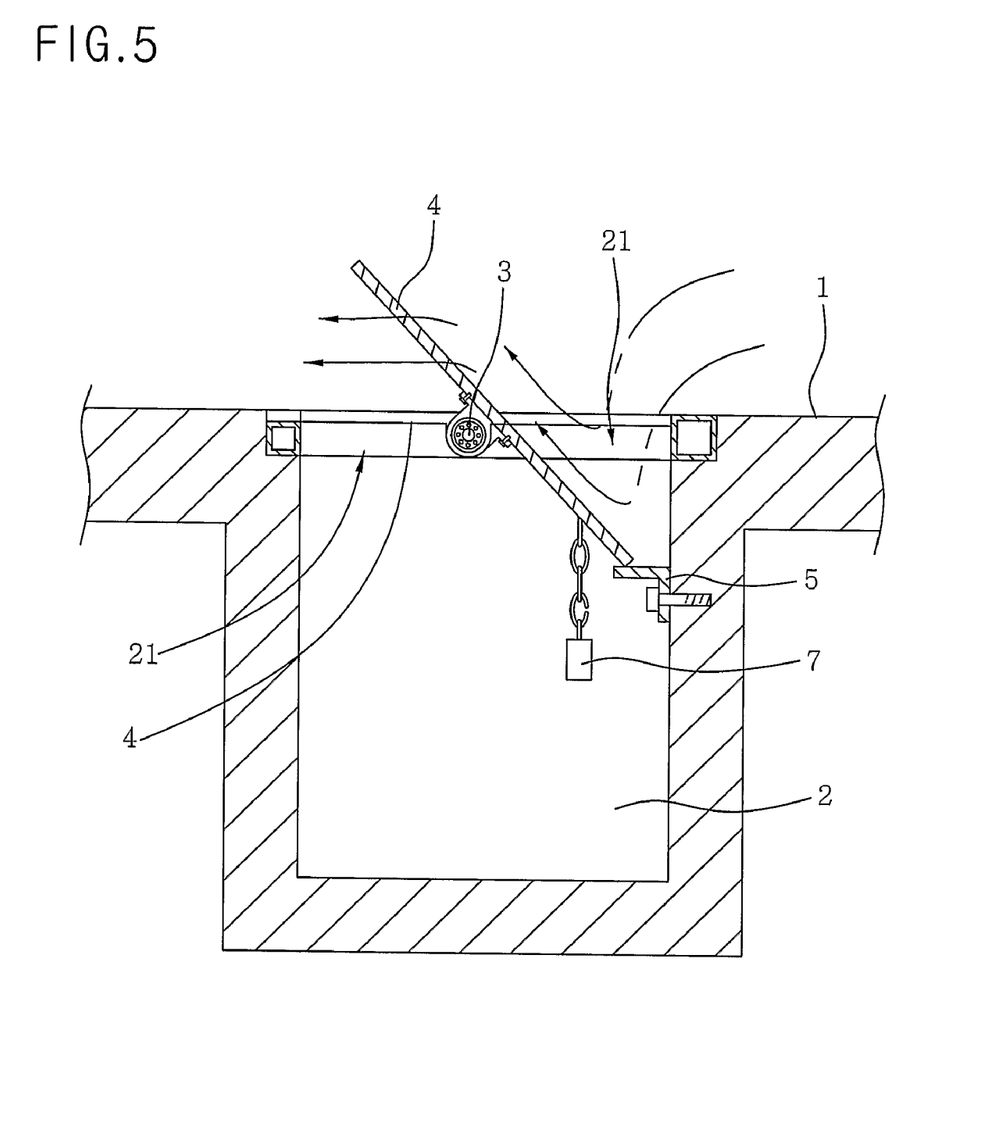
FIG. 5 is a schematic sectional view explaining operation of the soil inflow prevention apparatus according to the first embodiment of the present invention.

FIG. 5 is a schematic sectional view explaining operation of the soil inflow prevention apparatus according to the first embodiment of the present invention. As shown in FIG. 5, under normal conditions, the angular-rotation opening/closing plate 4, arranged in the sewage inflow hole 21, is inclined as indicated by a solid line so that the rear portion of the rotating opening/closing plate 4 is downwardly lowered to keep a rear region of the sewage inflow hole 21 in an opened state. Thereby, a constant amount of sewage is continuously introduced into the intercepting sewer 2 by passing through the sewage inflow hole 21, so as to be discharged to a sewage treatment plant.

Conversely, in the beginning of rainfall, a great amount of sewage, containing soil, is abruptly converged and introduced into the open rear region of the sewage inflow hole 21. In this case, the opening stopper 5 of the present invention supports a rear end of the angular-rotation opening/closing plate 4, to prevent the rear portion of the angular-rotation opening/closing plate 4 from being lowered downwardly beyond a predetermined angle.

Thereby, the sewage, which contains a relatively large amount of soil, is guided to flow from the rear portion of the angular-rotation opening/closing plate 4 toward a front upwardly inclined portion of the opening/closing plate 4, thereby acting to push the front portion of the angular-rotation opening/closing plate 4 down. As a result, the angular-rotation opening/closing plate 4 can be rapidly changed from the inclined state to a horizontal state as indicated by a dash dot dotted line, thereby closing the sewage inflow hole 21 of the intercepting sewer 2.

By preventing soil from entering the intercepting sewer 2 in the beginning of rainfall that causes a rapid increase in an inflow amount of sewage, the present invention eliminates a risk of a reduction in the cross sectional area of the intercepting sewer 2 due to an inflow of soil and prevents soil from being transferred to a sewage treatment plant.

Referring again to FIG. 3, it should be understood that the closing force of the angular-rotation opening/closing plate 4 is adjustable by exchanging the rear weighting device 7 that is suspended from the lower surface of the rear portion of the angular-rotation opening/closing plate 4.

Such an adjustment in the closing force of the angular-rotation opening/closing plate 4 enables an operator to take a prompt action in response to a variation in the amount of sewage, and achieves compatible use of the apparatus regardless of the amount of sewage.

Figure 6:
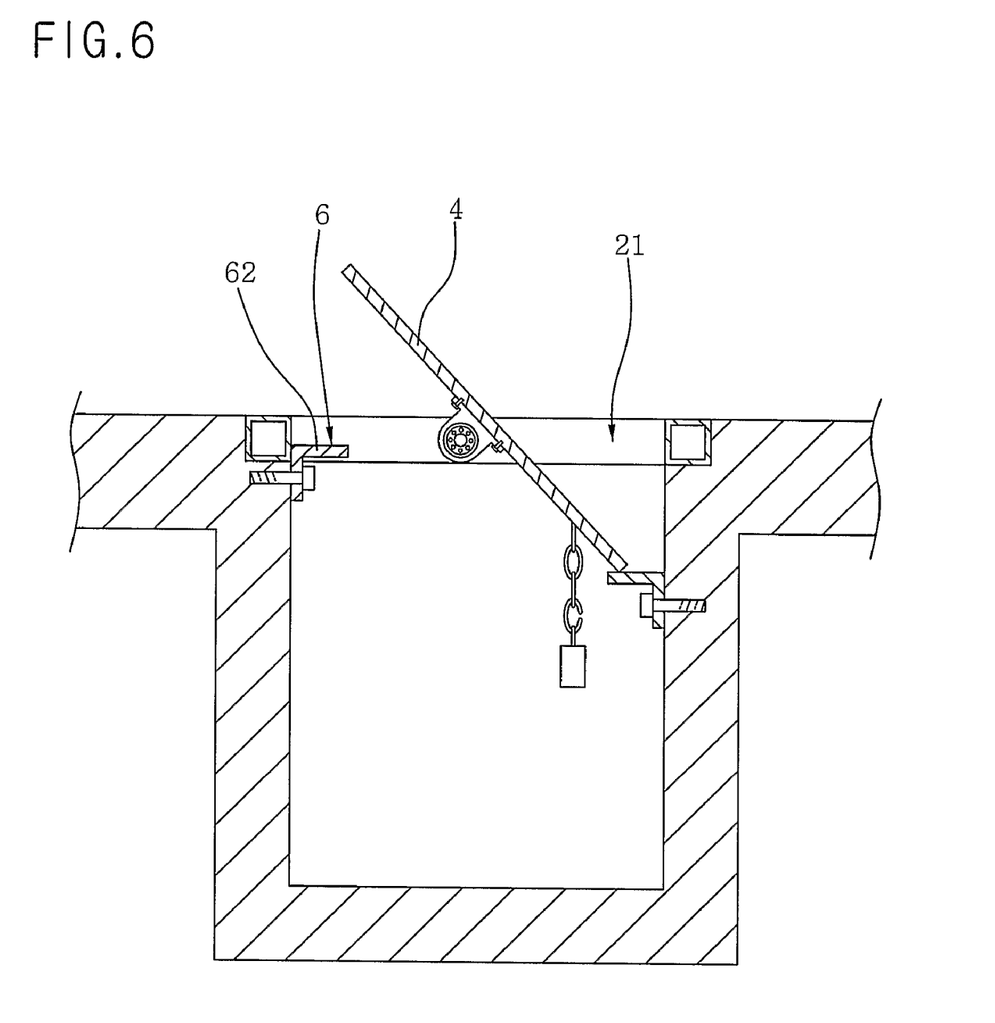
FIG. 6 is a sectional view illustrating an alternative configuration of a balancing stopper according to the present invention.

FIG. 6 illustrates an alternative configuration of the balancing stopper according to the present invention. Differently from the above described first embodiment, an alternative balancing stopper 6 takes the form of a front protrusion 62. The front protrusion 62 is formed at the front end position of the periphery of the sewage inflow hole 21, so that the front end of the angular-rotation opening/closing plate 4 is seated thereon.

The protrusion 62 is fixed to the periphery of the sewage inflow hole 21 via fixing means such as bolts or via welding.

Through the use of the protrusion 62 that protrudes rearward from the front end position of the sewage inflow hole 21, it is possible to prevent the front end of the angular-rotation opening/closing plate 4 from being lowered beyond a horizontal state.

Figure 7:
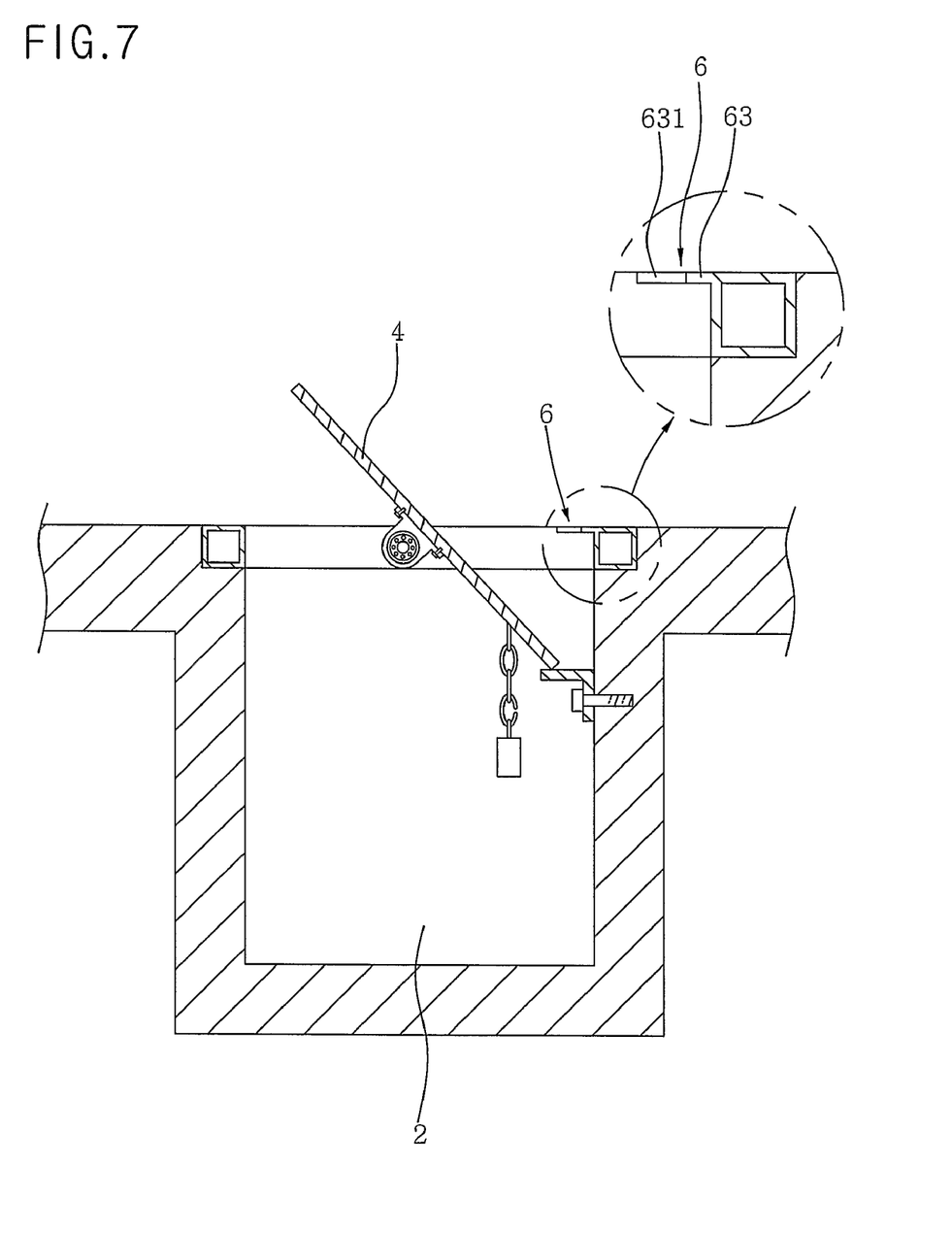
FIG. 7 is a sectional view illustrating another alternative configuration of a balancing stopper according to the present invention.

FIG. 7 illustrates another alternative configuration of the balancing stopper according to the present invention. Differently from the above described first embodiment, an alternative balancing stopper 6 takes the form of a rear protrusion 63 formed at a rear end position of the periphery of the sewage inflow hole 21.

The rear protrusion 63 is a horizontal plate having a predetermined width. At a front end region of the horizontal plate is formed a plurality of recesses 631, to achieve smooth inflow of sewage.

When an inflow amount of sewage increases due to rainfall, the rear protrusion 63 pushes the rear end of the angular-rotation opening/closing plate 4, to keep the angular-rotation opening/closing plate 4 in a horizontal state. Also, the recesses 631, formed at the front end region of the rear protrusion 63, serve as guides to allow sewage to be smoothly introduced into the intercepting sewer 2.

Figure 8:
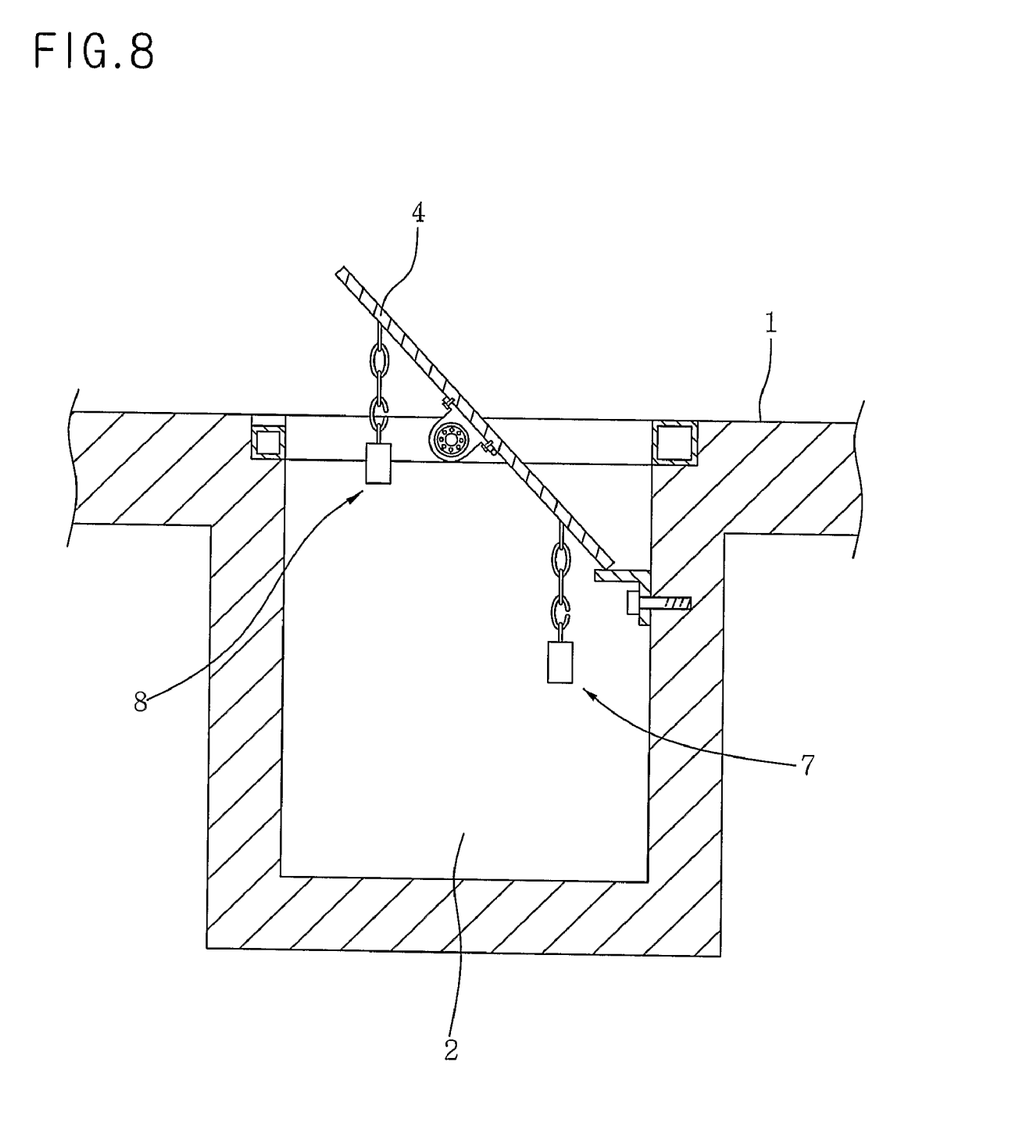
FIG. 8 is a sectional view illustrating a soil inflow prevention apparatus according to a second embodiment of the present invention.

FIG. 8 illustrates a soil inflow prevention apparatus according to a second embodiment of the present invention. As compared to the first embodiment, in the present embodiment, at least one front weighting device 8 is further suspended from the lower surface of the front portion of the angular-rotation opening/closing plate 4 to adjust the closing force of the angular-rotation opening/closing plate 4 in accordance with the amount of sewage.

The front weighting device 8, suspended from the lower surface of the front portion of the angular-rotation opening/closing plate 4, is easy to exchange, and thus facilitate an adjustment in the closing force of the angular-rotation opening/closing plate 4.

Figure 9:
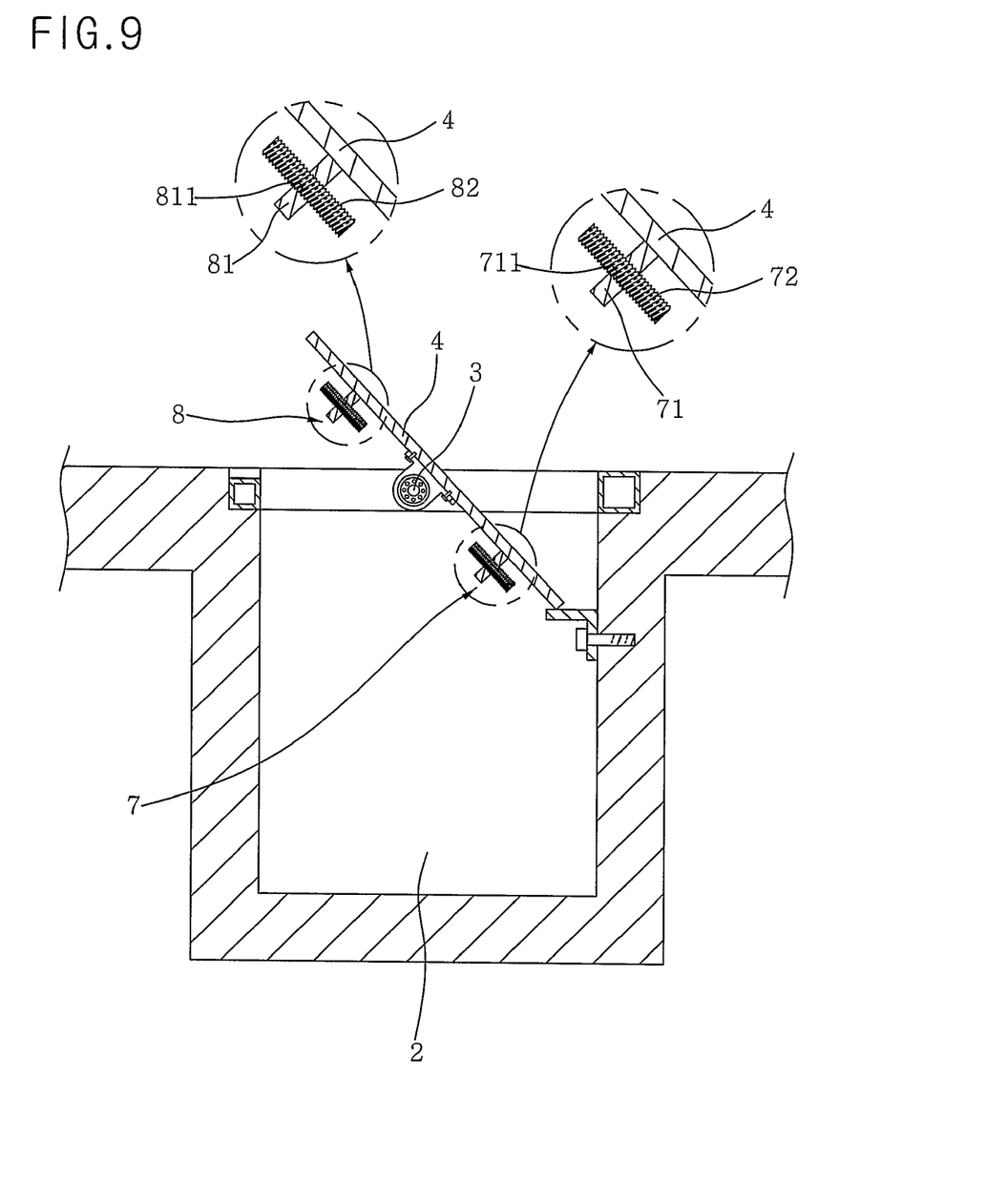
FIG. 9 is a sectional view illustrating alternative configurations of front and rear weighting devices according to the present invention.

FIG. 9 illustrates alternative configurations of the front and rear weighting devices according to the present invention. An alternative rear weighting device 7 according to the present invention includes: a nut 71 that is fixed to the angular-rotation opening/closing plate 4 and has a longitudinal tap hole 711; and a spiral shaft 72 longitudinally fastened in the tap hole 711 and adapted to vary a lowering weight of the rear weighting device 7 about the rotating shaft 3 via an adjustment of front and rear positions thereof.

That is, as the spiral shaft 72 is rotated to adjust the front and rear positions thereof, the lowering weight of the rear weighting device 7 about the rotating shaft 3 can be varied. Thereby, the closing force of the angular-rotation opening/closing plate 4 can be easily adjusted in response to a variation in the amount of sewage.

Also, an alternative front weighting device 8 according to the present invention includes: a nut 81 that is fixed to the angular-rotation opening/closing plate 4 and has a longitudinal tap hole 811; and a spiral shaft 82 longitudinally fastened in the tap hole 811 and adapted to vary the lowering weight of the front weighting device 8 about the rotating shaft 3 via an adjustment of front and rear positions thereof.

That is, as the spiral shaft 82 is rotated to adjust the front and rear positions thereof, the lowering weight of the rear weighting device 8 about the rotating shaft 3 can be varied. Thus, the closing force of the angular-rotation opening/closing plate 4 can be easily adjusted in response to a variation in the amount of sewage.

Figure 10:
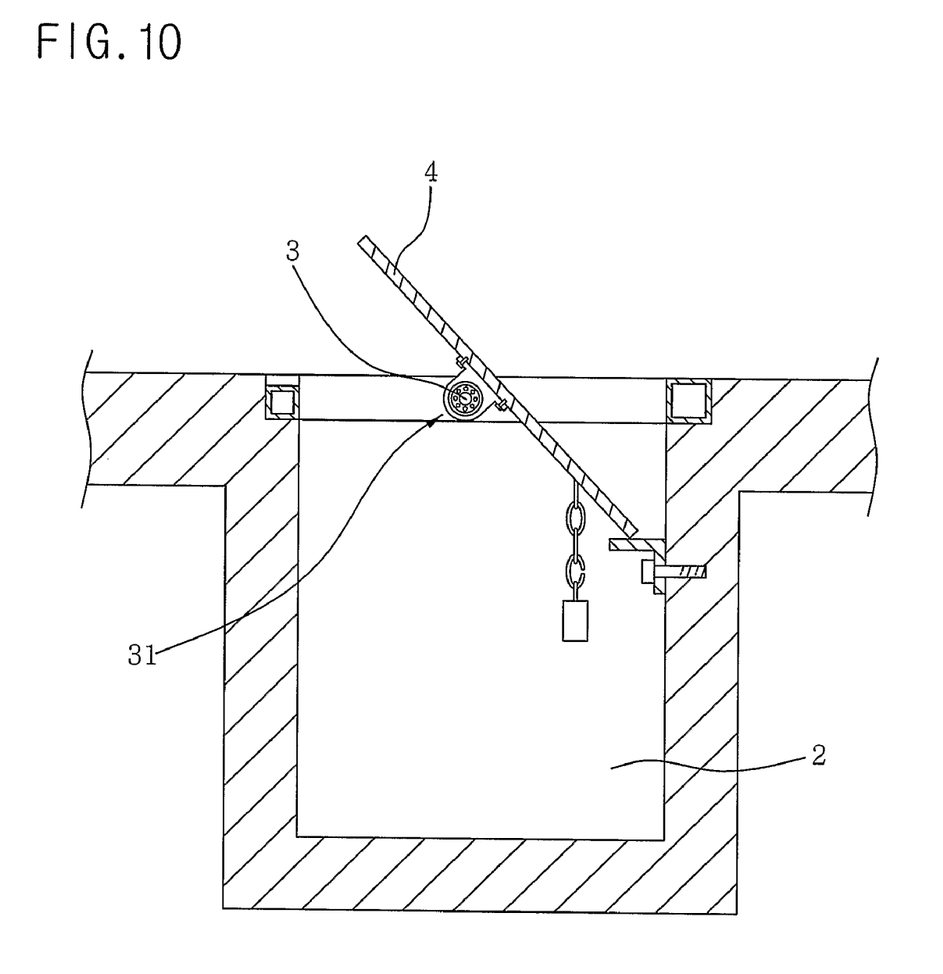
FIG. 10 is a sectional view illustrating a soil inflow prevention apparatus according to a third embodiment of the present invention.

FIG. 10 is a sectional view illustrating a soil inflow prevention apparatus according to a third embodiment of the present invention. The soil inflow prevention apparatus of the third embodiment is identical to those of the first and second embodiments except for the rotating shaft 3 that is used to support the angular-rotation opening/closing plate 4.

The soil inflow prevention apparatus according to the third embodiment of the present invention is characterized in that the rotating shaft 3, which supports the angular-rotation opening/closing plate 4, is fixed to a forwardly moved position from the center axis of the angular-rotation opening/closing plate 4 by use of the connection means 31.

When the fixing position of the rotating shaft 3 is moved forward from the center axis of the angular-rotation opening/closing plate 4, the rear portion of the angular-rotation opening/closing plate 4 about the rotating shaft 3 is heavier than the front portion of the plate 4. This is advantageous in that the angular-rotation opening/closing plate 4 can be stably maintained in an opened state under normal conditions.

Figure 11:
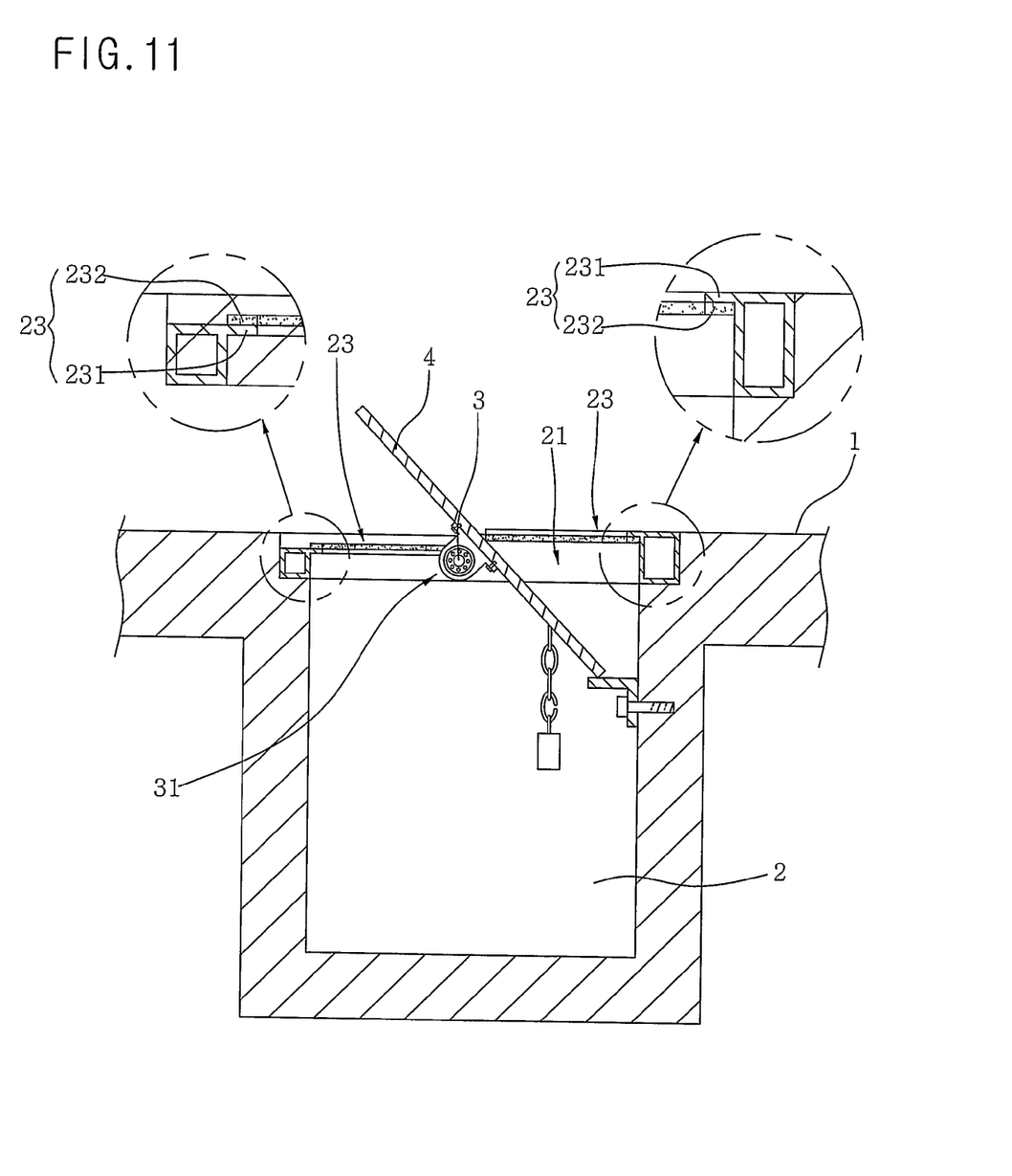
FIG. 11 is a sectional view illustrating a soil inflow prevention apparatus according to a fourth embodiment of the present invention.

FIG. 11 is a sectional view illustrating a soil inflow prevention apparatus according to a fourth embodiment of the present invention. The soil inflow prevention apparatus of the fourth embodiment is configured in such a fashion that: three front water-seal plates 23 protrude rearward from a front end portion of the periphery of the sewage inflow hole 21 at opposite end positions and a center position relative to the rotating shaft 3, and each front water-seal plate 23 includes an extension plate 231 and a rubber layer 232 to come into close contact with the front end of the lower surface of the angular-rotation opening/closing plate 4 in order to prevent sewage from entering the intercepting sewer 2 when the angular-rotation opening/closing plate 4 is rotated to close the sewage inflow hole 21; and three rear water-seal plates 23 protrude forward from a rear end portion of the periphery of the sewage inflow hole 21 at opposite end positions and a center position relative to the rotating shaft 3, and each rear water-seal plate 23 includes the extension plate 231 and the rubber layer 232 to come into close contact with the rear end of the lower surface of the angular-rotation opening/closing plate 4 in order to prevent sewage from entering the intercepting sewer 2 when the angular-rotation opening/closing plate 4 is rotated to close the sewage inflow hole 21.

With this configuration, the angular-rotation opening/closing plate 4 can be closed to seal the intercepting sewer 2 in the rainy season that shows much rainwater, thereby preventing sewage containing soil from entering the intercepting sewer 2 even in the rainy season.

As apparent from the above description, the soil inflow prevention apparatus of the present invention provides the following several effects.

Firstly, according to the present invention, it is possible to prevent soil from entering an intercepting sewer in the beginning of rainfall that experiences an increase in an inflow amount of sewage. This has the effect of preventing a reduction in a cross sectional area of the intercepting sewer due to an inflow of soil, and also of preventing soil from being transferred to a sewage treatment plant.

Secondly, the present invention provides an angular-rotation opening/closing plate that can be simply operated to open and close a sewage inflow hole of the intercepting sewer merely by the weight of sewage. This has the effect of minimizing manufacturing costs of the soil inflow prevention apparatus.

Thirdly, the present invention employs rear weighting devices capable of increasing the weight of a rear portion of the angular-rotation opening/closing plate. This allows sewage to smoothly flow into the intercepting sewer under normal conditions.

Fourthly, the rear weighting devices provided at the angular-rotation opening/closing plate are exchangeable or adjustable in weight, to adjust a closing force of the angular-rotation opening/closing plate in response to a variation in the amount of sewage due to rainfall. Such an ability to promptly correspond to a variation in the amount of sewage enables compatible use of the soil inflow prevention apparatus regardless of the amount of sewage. Also, under normal conditions, the rear weighting devices act to lower the rear portion of the angular-rotation opening/closing plate to open a rear region of the sewage inflow hole, thereby ensuring smooth inflow of sewage into the intercepting sewer.

Fifthly, according to the present invention, since the angular-rotation opening/closing plate can delicately operate in response to a variation in the amount of sewage, it is possible to prevent malfunction due to irrotational motion of the angular-rotation opening/closing plate 4.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A soil inflow prevention apparatus for use in an intercepting sewer that is provided at a discharge side of a drainage ditch and has one or more sewage inflow holes, the apparatus comprising:
   a rotating shaft transversely extending throughout a respective one of the sewage inflow holes;
   an angular-rotation opening/closing plate coupled to the rotating shaft and adapted to open and close the sewage inflow hole by rotation of the angular-rotation opening/closing plate about the rotating shaft in accordance with the amount of sewage, the rotating shaft being fixed to a center of the angular-rotation opening/closing plate by use of connection means;
   at least one opening stopper provided at a rear wall of the intercepting sewer to control an opening angle of the angular-rotation opening/closing plate;
   at least one rear weighting device provided at the lower surface of the rear portion of the angular-rotation opening/closing plate;
   at least one front weighting device provided at the lower surface of the front portion of the angular-rotation opening/closing plate; and
   at least one balancing stopper provided at the periphery of the sewage inflow hole in the front or rear of the rotating shaft to keep the angular-rotation opening/closing plate in a closed state,
   wherein the rear weighting device includes:
   a first nut that is fixed to the angular-rotation opening/closing plate and has a first longitudinal tap hole; and
   a first spiral shaft longitudinally fastened in the first tap hole and adapted to vary rotational momentum of the angular-rotation opening/closing plate about the rotating shaft via an adjustment in front and rear positions of the first spiral shaft, and
   wherein the front weighting device includes:
   a second nut that is fixed to the angular-rotation opening/closing plate and has a second longitudinal tap hole; and
   a second spiral shaft longitudinally fastened in the second tap hole and adapted to vary rotational momentum of the angular-rotation opening/closing plate about the rotating shaft via an adjustment in front and rear positions of the second spiral shaft.

2. The apparatus as set forth in claim 1, wherein the rotating shaft is fixed at a forwardly moved position from a center of the angular-rotation opening/closing plate by use of connection means.

3. The apparatus as set forth in claim 1, wherein the balancing stopper includes a groove formed at a front end position of the periphery of the sewage inflow hole to catch a front end of the angular-rotation opening/closing plate.

4. The apparatus as set forth in claim 1, wherein the balancing stopper includes a front protrusion that protrudes from a front end position of the periphery of the sewage inflow hole to allow a front end of the angular-rotation opening/closing plate to be seated thereon.

5. The apparatus as set forth in claim 1, wherein the balancing stopper includes a rear protrusion that protrudes from a rear end position of the periphery of the sewage inflow hole.

6. The apparatus as set forth in claim 5, wherein the rear protrusion is a horizontal plate having a predetermined width, and a plurality of recesses is formed in a front region of the horizontal plate to achieve smooth inflow of sewage.

7. The apparatus as set forth in claim 1,
   wherein three front water-seal plates protrude rearward from a front end portion of the periphery of the sewage inflow hole at opposite end positions and a center position relative to the rotating shaft, and each front water-seal plate includes an extension plate and a rubber layer to come into close contact with a front end of a lower surface of the angular-rotation opening/closing plate in order to prevent sewage from entering the intercepting sewer when the angular-rotation opening/closing plate is rotated to close the sewage inflow hole, and
   wherein three rear water-seal plates protrude forward from a rear end portion of the periphery of the sewage inflow hole at opposite end positions and a center position relative to the rotating shaft, and each rear water-seal plate includes the extension plate and the rubber layer to come into close contact with a rear end of the lower surface of the angular-rotation opening/closing plate in order to prevent sewage from entering the intercepting sewer when the angular-rotation opening/closing plate is rotated to close the sewage inflow hole.

8. The apparatus as set forth in claim 1, further comprising:
   a frame provided at the periphery of a respective one of the sewage inflow holes.

9. The apparatus as set forth in claim 1, further comprising:
   a pair of bearings provided between opposite ends of the rotating shaft and opposite lateral sides of the sewage inflow hole, respectively, to enable smooth rotation of the rotating shaft.

10. The apparatus as set forth in claim 9, wherein the connection means includes:
   one or more bearing brackets fixed to a lower surface of the angular-rotation opening/closing plate; and
   one or more bearings received in the bearing brackets, respectively, to be rotatably assembled with the rotating shaft.

* * * * *